United States Patent [19]

Morimoto et al.

[11] Patent Number: 5,038,380
[45] Date of Patent: Aug. 6, 1991

[54] METHOD FOR RECOGNIZING POSITION OF COMPONENT AND APPARATUS THEREFOR

[75] Inventors: Masamichi Morimoto, Osaka; Kazumasa Okumura, Uji, both of Japan

[73] Assignee: Matsushita Electric Industrial Co., Ltd., Kadoma, Japan

[21] Appl. No.: 344,584

[22] Filed: Apr. 28, 1989

[30] Foreign Application Priority Data

Apr. 28, 1988 [JP] Japan .................................. 63-106321

[51] Int. Cl.⁵ .............................................. G06K 9/00
[52] U.S. Cl. .......................................... 382/8; 382/48
[58] Field of Search ........................................ 382/8, 48

[56] References Cited

U.S. PATENT DOCUMENTS 4,163,212  7/1979  Buerger et al. ............ 340/146.3 H
4,628,464  12/1986  McConnell .................... 364/513
4,630,225  12/1986  Hisano ......................... 364/559
4,803,735  2/1989  Nishida et al. .................... 382/8

Primary Examiner—Leo H. Boudreau
Assistant Examiner—Andrew W. Johns
Attorney, Agent, or Firm—Cushman, Darby & Cushman

[57] ABSTRACT

An X-Y coordinate is set on a video image including a component sucked with a suction tube, then two horizontal reference lines parallel to the Y-axis having a first predetermined length which is shorter than the length of the component and intersecting with the video image of the component are detected, and two vertical reference lines parallel to the X-axis having a second predetermined length which is shorter than the width of the component and intersecting with the video image of the component are also detected, and X-coordinates of the two horizontal reference lines and Y-coordinates of the two vertical reference lines are detected, subsequently, averages of the two X-coordinates and Y-coordinates are calculated, and the central position of the component is recognized on basis of these averages.

2 Claims, 9 Drawing Sheets

METHOD FOR RECOGNIZING POSITION OF COMPONENT AND APPARATUS THEREFOR

FIELD OF THE INVENTION AND RELATED ART STATEMENT

1. Field of the Invention

The present invention relates generally to a method for recognizing a central position of a component, and more particularly to a method for detecting a central position of a component which is sucked with a suction tube of a component assembly machine.

2. Description of the Related Art

Figure 1:
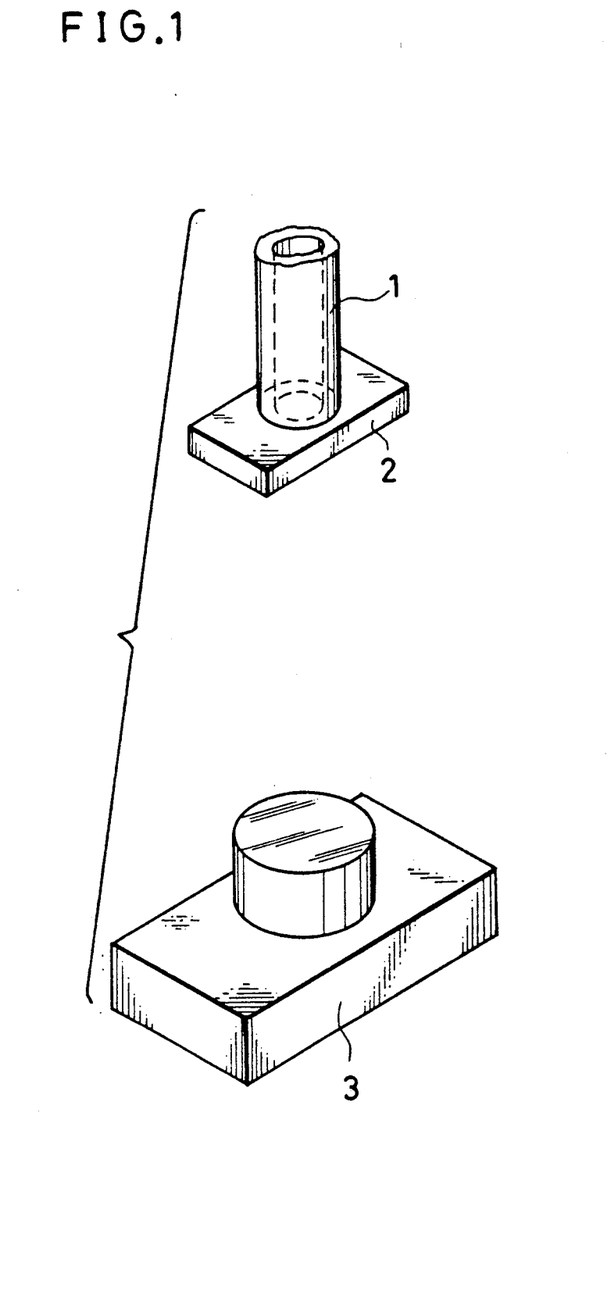
FIG. 1 is a perspective view of the relevant parts of a component assembly machine in which a position recognition method of a component in accordance with the present invention is applied.

In a conventional component assembly machine, a component such as an electronic component is sucked with a suction tube and is carried to a predetermined position to be mounted. The component 2 sucked with the suction tube 1, as shown in FIG. 1, is positioned over a video camera 3 for detecting the image of the component 2 prior to a mounting step.

Figure 6:
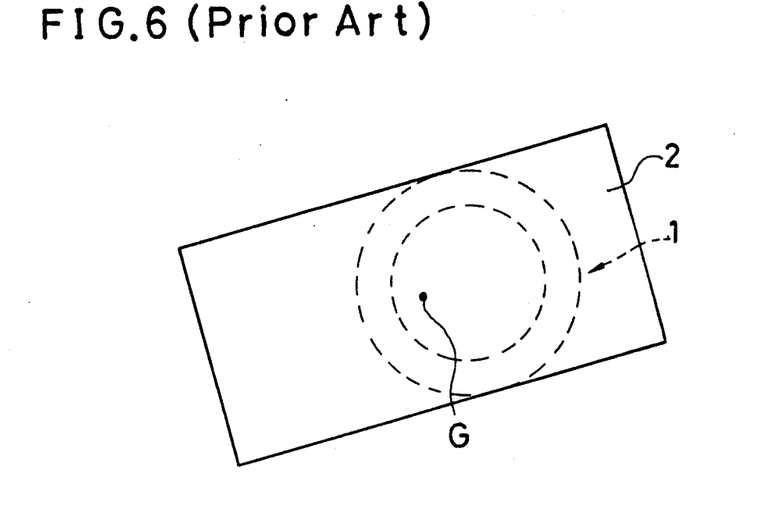
FIG. 6 is the video image of the component which is sucked in the normal positioning form in the component assembly machine in the prior art.
Figure 7:
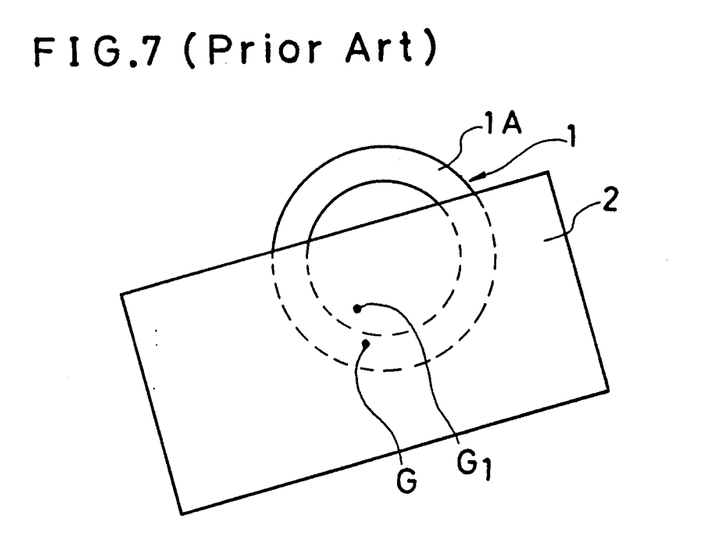
FIG. 7 is the video image of the component which is sucked with the suction tube at a deviated position from the center of the component in the prior art.

FIG. 6 is a video image of the component 2 which is sucked with the suction tube 1 in better normal form. On the contrary, FIG. 7 is a video image of the suction tube 1 and the component 2 which is sucked with the suction tube 1 at a position shifted from the center of gravity G of the component 2. The center of gravity G of these video images are detected by a method which is known to one with ordinary skill in the art and the detailed description is omitted in the specification. Then, the detected center of gravity G of the component 2 is recognized as the center thereof.

In the above-mentioned conventional recognition method, however, as shown in FIG. 7, when the component 2 is sucked with the suction tube 1 at the position shifted from the center, a portion 1A of the suction tube 1 protrudes from the component 2. Consequently, the video image including the portion 1A is recognized as the component 2, and a detected center of gravity $G_1$ is different from the true center of gravity G. Positional deviation of the component 2 with respect to the suction tube 1 is caused by variation of a position of the component 2 which is supplied from a supplying machine, and when the size of the component 2 is slightly larger than an outer diameter of the suction tube 1, for example 0.8 mm in width, 1.6 mm in length of the component 2, and 0.8 mm in outer diameter of the suction tube 1, the deviation of the component 2 cannot be disregarded in recognition of the center of the component 2.

OBJECT AND SUMMARY OF THE INVENTION

An object of the present invention is to provide a method for recognizing the center of a component even if the component is positioned at a deviated position with respect to a suction tube in a component assembly machine.

In the method for recognizing a position of a component in accordance with the present invention, a video image of the component is generated, and an X-Y coordinate is set in the video image, then two horizontal reference lines having a predetermined length which are parallel with the Y-axis of the X-Y coordinate and intersect with the video image of the component are detected, and two vertical reference lines having a second predetermined length which are parallel with the X-axis of the X-Y coordinate and intersect with the video image of the component are detected, furthermore an average of two Y-coordinate values of the vertical reference lines and an average of two X-coordinate values of the horizontal reference lines are calculated, and thus a central position of the component is detected on the basis of these average values.

DESCRIPTION OF THE PREFERRED EMBODIMENTS

FIG. 1 shows relevant parts of a component assembly machine in which a recognition method of a position of a component in accordance with the present invention is applied thereto. Referring to FIG. 1, a suction tube 1 sucks a component 2 such as an IC by air suction force, and a video camera 3 is disposed under the suction tube 1 so as to detect the component 2.

Figure 2:
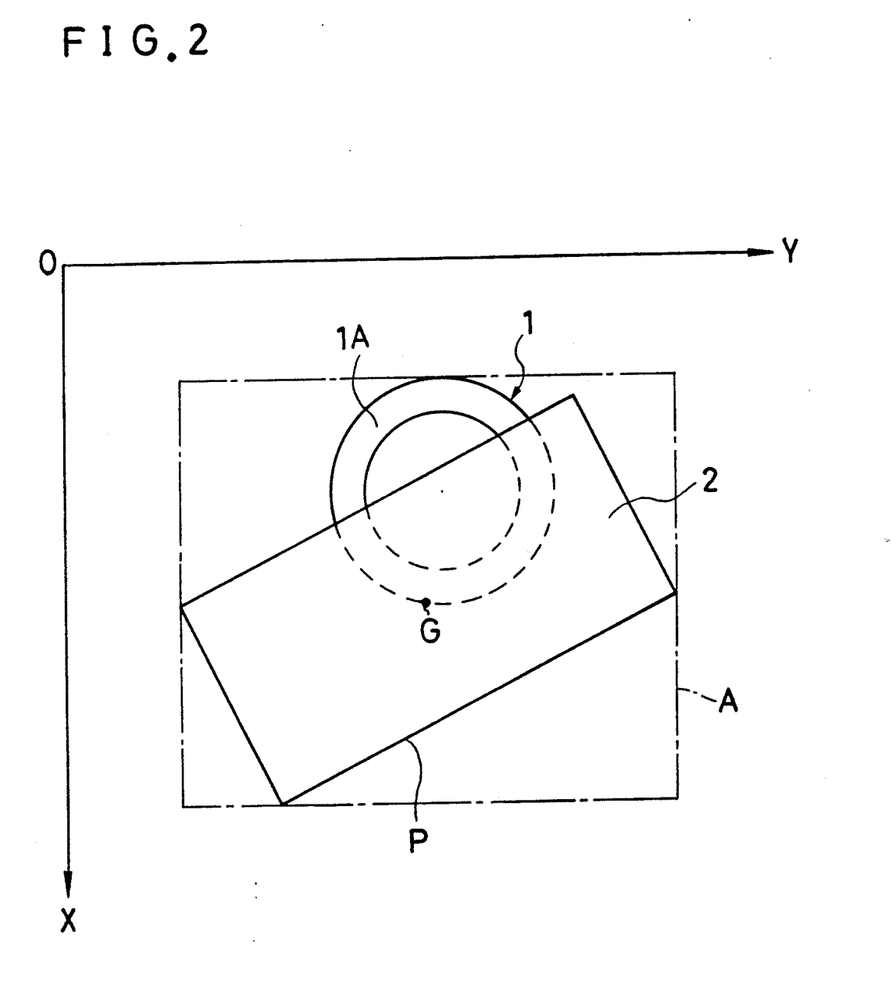
FIG. 2 is a video image of a suction tube and the component which are generated by a video camera of the component assembly machine and an image region A which is set in the video image.

FIG. 2 is a video image detected by the video camera 3. In the video image, the component 2 is tilted with respect to an X-Y coordinate set in the video image and is positioned at a deviated position with respect to the suction tube 1. And a portion 1A of the suction tube 1 protrudes from the component 2. The sucking force of the suction tube 1 is selected so as to hold the component 2 in the protruded status of the suction tube 1 from the component 2. An outer diameter of the suction tube 1 in the embodiment is 0.8 mm, and a size of the component 2 is 0.8 mm × 1.6 mm, for example.

Figure 5:
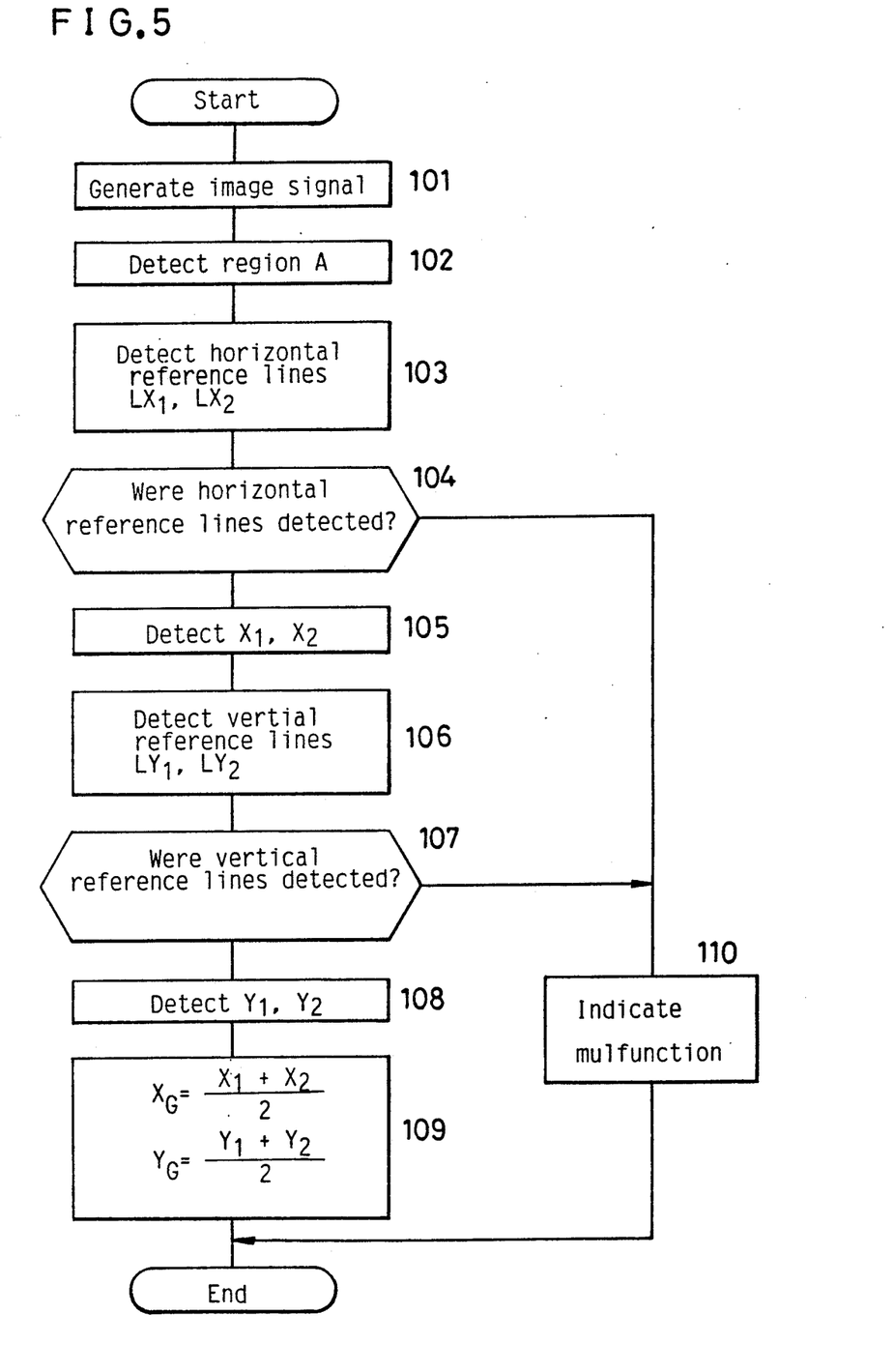
FIG. 5 is a flow chart in the embodiment.

The process of the method is illustrated by a flow chart of FIG. 5. The video image of the component is generated as shown in FIG. 2 (Step 101).

Figure 4:
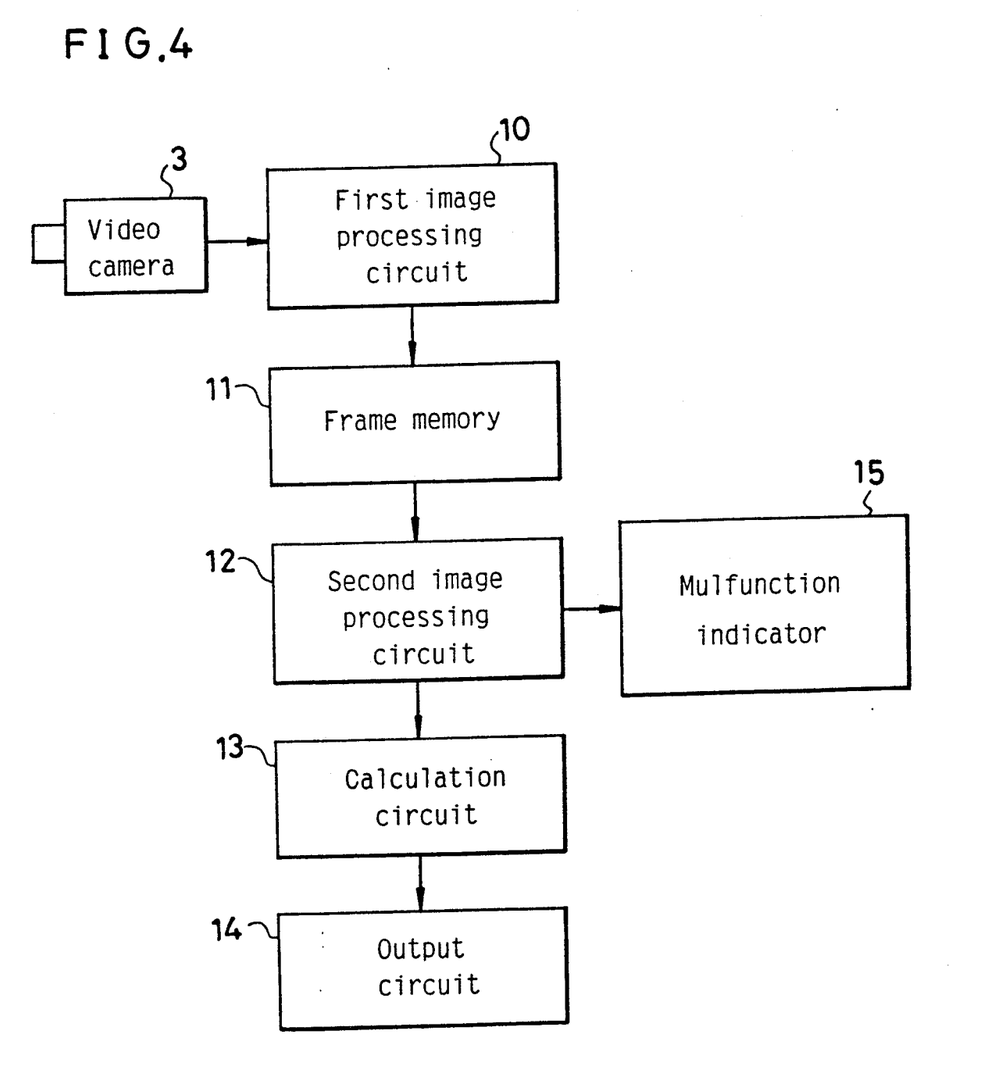
FIG. 4 is a block diagram of the component assembly machine in the embodiment.

Referring to FIG. 2, the X-Y coordinate is set on the video image generated by the video camera 3, and the video image is scanned in X and Y directions. Then, a region A surrounded by two lines which are parallel with the X-axis and two lines which are parallel with Y-axis and contact with the video images of the component and the suction tube are detected by a first image processing circuit 10 of the component assembly machine as shown in FIG. 4 (Step 102). Image data of the region A is memorized in a frame memory 11, and subsequent image processing is applied to the image data of the region A so that a processing for an irrelevant portion of the video image can be prevented and image processing is efficiently accomplished.

Figure 3A:
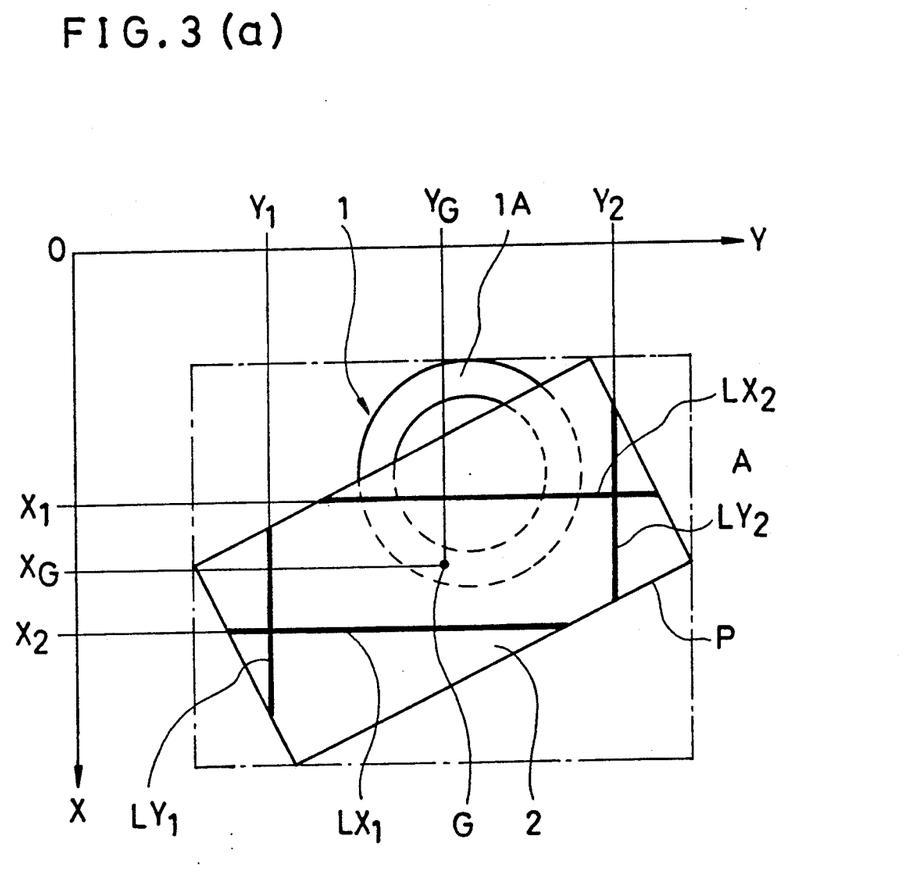
FIG. 3(a) is a video image including horizontal reference lines and vertical reference lines which are detected in the image region A of the embodiment.

Subsequently, the region A is scanned in the direction Y, and two horizontal reference lines $LX_1$ and $LX_2$ having a first predetermined length (The length is designated as "horizontal reference length" and is 1.2 mm in the embodiment, for example.) of scanning lines crossing the video image of the component 2 are detected (Step 103).

Then presence of the horizontal reference lines $LX_1$, $LX_2$ is examined (Step 104). When the horizontal reference lines $LX_1$, $LX_2$ are not detected, malfunction of the process is indicated by a malfunction indicator 108 (Step 110). X-coordinate values $X_1$ and $X_2$ of the horizontal reference lines $LX_1$ and $LX_2$ are detected, respectively, as shown in FIG. 3(a) (Step 105). Moreover, the region A is scanned in the direction X, and two vertical reference lines $LY_1$ and $LY_2$ having a second predetermined length (The length is designated as "vertical reference length" and is 0.6 mm in the embodiment, for example.) of the scanning lines crossing the video image are detected (Step 106).

Then the presence of the vertical reference lines $LY_1$, $LY_2$ is examined (Step 107). When the vertical reference lines $LY_1$, $LY_2$ are not detected, malfunction of the process is indicated by the malfunction indicator 108 (Step 110). The Y-coordinate values $Y_1$ and $Y_2$ of the vertical reference lines $LY_1$ and $LY_2$ are detected, respectively (Step 108). A value which is shorter than a length in the horizontal direction of the component 2 is selected as the horizontal reference length, and a value which is shorter than the length in the vertical direction of the component 2 is selected as the vertical reference length.

In a calculation circuit 13, an X-coordinate $X_G$ and a Y-coordinate $Y_G$ of the center of gravity G of the component 2 are calculated by $$X_G = \frac{X_1 + X_2}{2} \\ Y_G = \frac{Y_1 + Y_2}{2} \bigg\} \text{(Step 109)}. \tag{1}$$

The data of the center of gravity G calculated by the calculation circuit 13 is output through an output circuit 14.

In the above-mentioned processing steps, the protruded portion 1A of the suction tube 1 in the video image as shown in FIG. 3(a) does not participate in detection of the horizontal reference lines and the vertical reference lines. Therefore, the detected position of the center of gravity of the component 2 is not influenced by the protruded portion 1A.

Figure 3B:
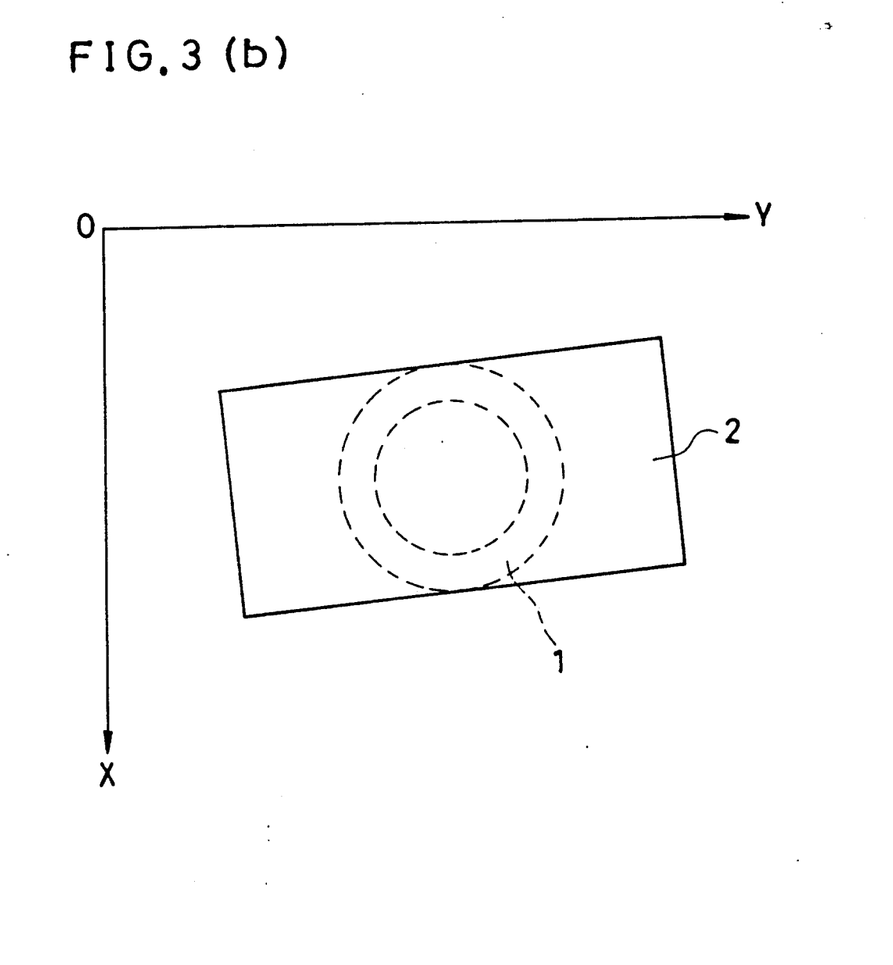
FIG. 3(b) is a video image of the component which are sucked by the suction tube in normal positioning form in the embodiment.
Figure 3C:
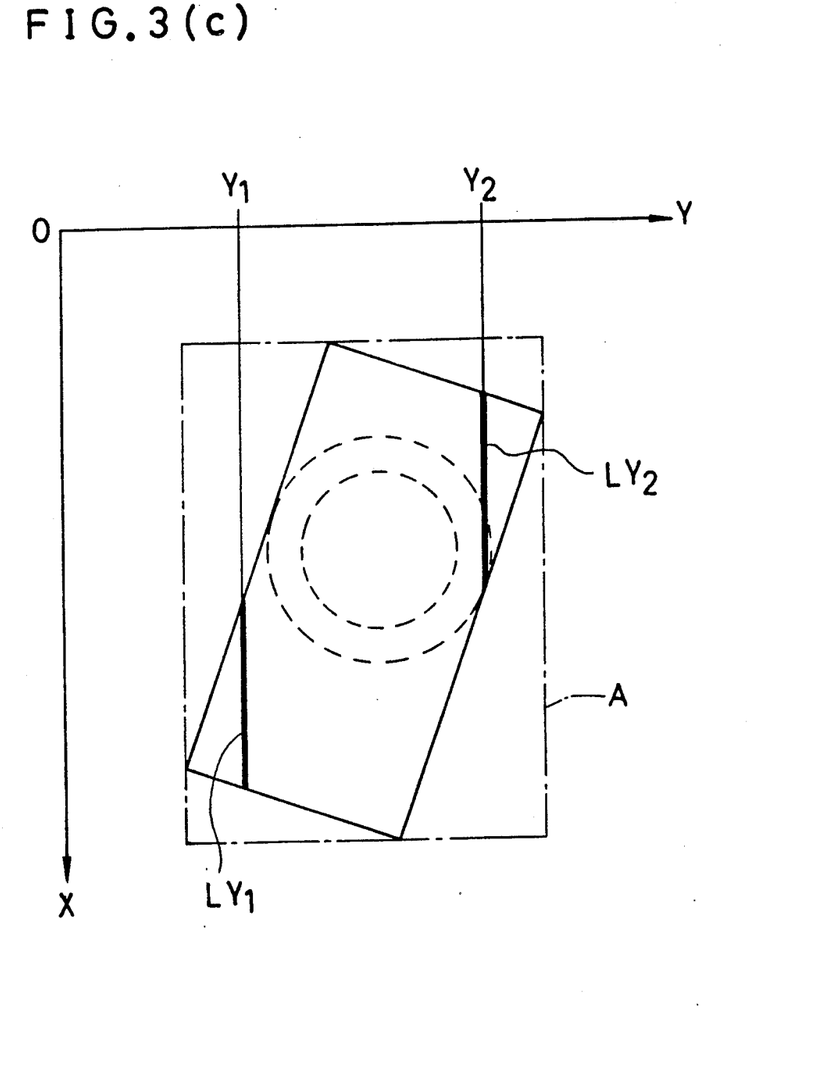
FIG. 3(c) is a video image of the component which is sucked with the suction tube in a manner that the component is rotated in the embodiment.

According to the method for recognizing the position of the component in accordance with the present invention, as shown in FIG. 3(c) in case that the component is significantly rotated from a normal position as shown in FIG. 3(b), though the vertical reference lines $LY_1$ and $LY_2$ are detected but the horizontal reference lines $LX_1$ and $LX_2$ can not be detected, because a length of the component in the direction of Y-axis does not reach the horizontal reference length. Therefore, the position of the center of gravity of the component 2 can not be calculated. The above-mentioned result also arises in case that the suction tube 1 sucks at the side surface of the component 2. In the above-mentioned case, an abnormal state of suction by the suction tube 1 is detected, and operation of the component mounting machine is stopped, for example. Furthermore, the abnormal positioning of the component is indicated by a malfunction indicator 15.

Figure 3D:
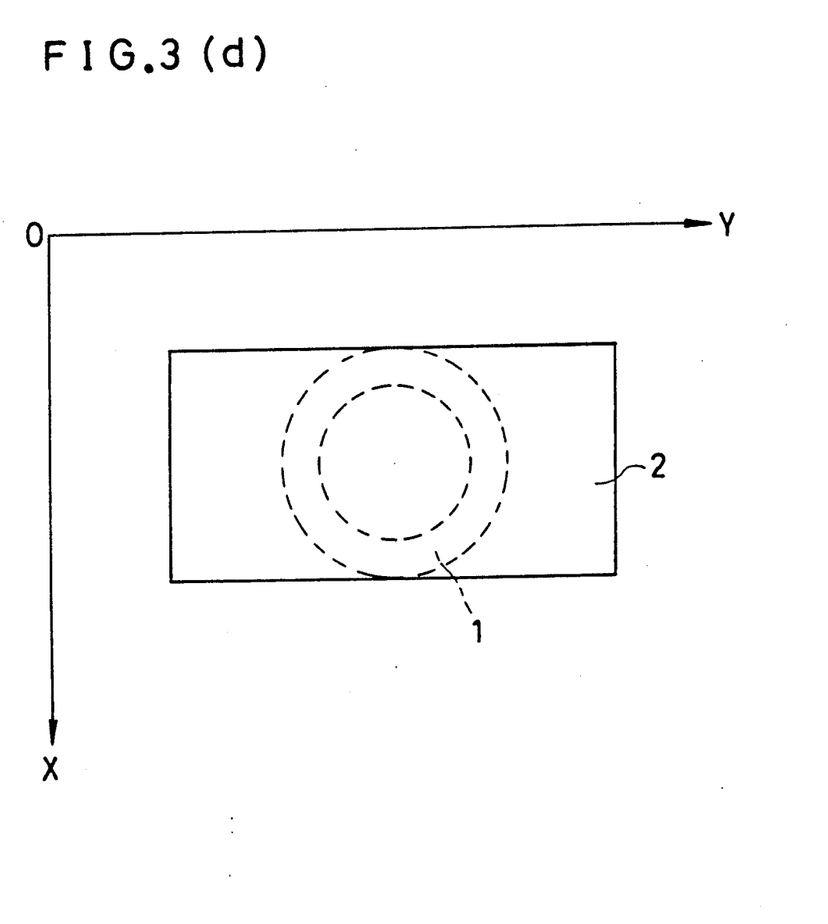
FIG. 3(d) is a video image of the component which is sucked in parallel with an X-axis or Y-axis.

As shown in FIG. 3(d), in case that the horizontal sides of the component 2 are parallel with the Y-axis and the vertical sides thereof are parallel with the X-axis, the horizontal reference line $LX_1$ coincides with the lower side of the video image of the component 2, the horizontal reference line $LX_2$ coincides with the upper side thereof, the vertical reference line $LY_1$ coincides with the left side thereof and the vertical reference line $LY_2$ coincides with the right side thereof.

In the component assembly machine in which the method for recognizing the position of the component in accordance with the present invention is applied, the position of the center of gravity G detected by the aforementioned method is recognized as a central position of the component 1. Then the component is positioned at a predetermined position of an object to be assembled on the basis of the central position thereof. Therefore, even if the component 2 is sucked with the suction tube 1 at a deviated position on the component 2, the component can be correctly positioned at the predetermined position.

Revolution of the component 1 from a normal position, as shown in FIG. 3(a), is corrected by a compensating circuit which is omitted in the block diagram of FIG. 4 and description in the specification.

What is claimed is:

1. A method for recognizing a position of a component comprising the steps of:
   generating a video image of a component on an X-Y coordinate,
   generating two horizontal reference lines having a first predetermined length under the length of said component and parallel with Y-axis of said X-Y coordinate and intersecting with the video image of said component, such that the end points said horizontal lines coincide with the edges of said component,
   generating two vertical reference lines having a second predetermined length under the width of said component and parallel with X-axis of said X-Y coordinate and intersecting with said video image of said component, such that the end points of said vertical lines coincide with the edges of said component, and
   calculating an average of two X-coordinates of said horizontal reference lines and an average of said two Y-coordinates of said vertical reference lines, and detecting a central position of said component on the basis of these average values.

2. An apparatus embodying the method for recognizing a position of a component comprising:
   a video camera for generating a video image of a component,
   an image processing circuit for generating two horizontal reference lines having a first predetermined length under the length of said component and in parallel with a Y-axis of said X-Y coordinate and intersect with the video image of the component such that the end points of said horizontal lines coincide with the edges of said component, and two vertical reference lines having a second predetermined length under the width of said component and in parallel with an X-axis of said X-Y coordinate and intersect with the video image of said component, such that the end points of said vertical lines coincide with the edges of said component, and calculating means for calculating an average of two X-coordinates of said horizontal reference lines and an average of two Y-coordinates of said vertical reference lines, and detecting a central position of said component on the basis of these average values.

* * * * *